J. T. QUIGLEY.
RECORDING DEVICE.
APPLICATION FILED NOV. 8, 1913.

1,249,193.

Patented Dec. 4, 1917.
6 SHEETS—SHEET 2.

Witnesses:
Horace A. Grossman
Carl L. Choate

Inventor:
John T. Quigley
by Emery Booth Janney Varney
Attys.

J. T. QUIGLEY.
RECORDING DEVICE.
APPLICATION FILED NOV. 8, 1913.

1,249,193.

Patented Dec. 4, 1917.
6 SHEETS—SHEET 4.

Witnesses:
Horace A. Crossman
Carl L. Choate

Inventor:
John T. Quigley
by Emery, Booth, Janney, Varney
Attys

UNITED STATES PATENT OFFICE.

JOHN T. QUIGLEY, OF BOSTON, MASSACHUSETTS, ASSIGNOR, BY MESNE ASSIGNMENTS, TO COSTMETER COMPANY, OF BOSTON, MASSACHUSETTS, A CORPORATION OF MASSACHUSETTS.

RECORDING DEVICE.

1,249,193.  Specification of Letters Patent.  Patented Dec. 4, 1917.

Application filed November 8, 1913. Serial No. 799,988.

*To all whom it may concern:*

Be it known that I, JOHN T. QUIGLEY, a citizen of the United States, and a resident of Boston, county of Suffolk, State of Massachusetts, whose post-office address is 9 Norway street, Boston, Mass., have invented an Improvement in Recording Devices, of which the following description, in connection with the accompanying drawings, is a specification, like characters on the drawings representing like parts.

This invention relates to measuring machines and more particularly, though not exclusively, to machines for measuring and recording the time cost of any given operation.

The object of the invention is to provide a device which will produce comparable records of the time cost of different operations carried on under different rates. This is done by subdividing a record medium into identified parts, the dimensions of which are proportional both to elapsing time and to the value of elapsing time for the respective operations being performed, whereby said parts when measured by a common standard of value will denote the time cost of the corresponding operation irrespective either of the elapsed time alone or the time cost rate alone.

In the preferred and described form the invention is embodied in a machine where the record medium consists of a paper strip or tape. This is subdivided into lengths the linear dimensions of which are proportional to the value of the time elapsed during the several operations performed by causing the tape to be fed relatively to marking devices at a rate which is so adjusted in each instance as to be proportional both to elapsing time and the characteristic rate of time cost for the operation being performed. By marking the tape at the beginning and end of each operation the tape is thereby subdivided or marked off into lengths which vary with the elapsed time and with the cost rate. When applied to a previously adopted scale of linear value these tape lengths represent thereon a certain time cost value irrespective of the elapsed time or the time cost rate associated therewith.

For different rates of time cost the rate of feed is proportionately changed but in each case with reference to the adopted scale of value, so that the length of tape marked off in each case represents a certain definite value expressed in terms of linear dimensions. That is to say, the cost of a given operation will be represented by a tape twice the length of one representing an operation performed in the same time at half the rate, or the same length as one representing an operation performed in twice the time at half the rate, or the same length as one representing an operation performed in half the time at twice the rate. Different time cost records, therefore, relating to the same work may be assembled by adding one to another and their aggregate length will represent on the adopted scale the aggregate value of the several operations irrespective of whether they were performed under the same or different time cost rates or in the same or different time periods.

To provide a continuous record of the time cost of any particular job, a scale sheet is preferably provided containing spaces whereon consecutive lengths of tape may be assembled in a continuous length one after another with reference to a linear scale, the latter expressed in units of money. By means of this scale the total time cost of the particular job may be ascertained at any time without computation, this being the value corresponding to the aggregate length of the several detached pieces of tape, each of which represents the time cost of separate and independent operations on the said job performed perhaps by different workmen and at different rates of time cost.

One feature of the invention is the provision of an identification element or tag which is adapted to accompany the material on which work is to be performed, or it may be arbitrarily designated to represent a certain class of work or time cost. Such identification tag bears marks identifying the work to which it belongs and is adapted to be removably applied to the recording machine and cause the latter to mark the length of tape corresponding to the operation with characters identifying the particular job or operation.

Means are preferably also provided for marking the tape with characters identifying the workman or machine performing the work, such means being preferably in the form of an element removable from the machine so that each operative may be provided with his own identifying device.

Another feature of the invention is the provision of means for accurately and positively feeding the tape or other record sheet so that it will travel at exactly the predetermined rate.

Another feature of the invention is the provision of novel printing and marking means whereby the record may be easily and clearly marked from an inking ribbon or other inking vehicle by the aid of devices of the utmost simplicity.

In the hereinafter described form of the invention two or more independent records may be simultaneously made through the use of a plurality of recording mediums which are fed with relation to the marking devices at different rates of speed. This permits the production of two records for any given operation one of which represents by its length and in respect to a selected scale, one element of time cost, such as the wage cost, and the other of which represents some element of time cost in the given operation other than the wage cost, such, for example, as the total time cost including both wage cost and overhead cost. Or one record may represent elapsed time alone on any suitable scale and the other some function of elapsed time such as time cost.

By means of this invention a separate recording device of the type herein described may be employed in connection with each production unit whether the latter consists of an operative or a machine with one or more operatives. The overhead cost for each production unit being readily ascertainable in advance, the total expense either with or without the wage expense may be recorded at the time any given operation is performed and the overhead expense thereby distributed among the appropriate operations at the time they are performed instead of leaving it to a difficult if not erroneous computation at some later time.

The invention will be best understood by reference to the following description when taken in connection with the accompanying illustration of one specific embodiment thereof, while its scope will be more particularly pointed out in the appended claims.

In the drawings:

Fig. 4ª shows in elevation the detail of the locking device for the work and operative identifying members;

Fig. 7 is a detail showing the printing wiper midway between the position shown in Fig. 6 and that in Fig. 8;

Referring to the drawings and to the specific embodiment of the invention therein shown, (particularly Figs. 4, 5, 6 and 9) the principal working parts of the recording device are arranged on either side of the upright plate 1 which is mounted lengthwise on the base 2. The parts are inclosed by the housing or casing 3 which renders them inaccessible to the workman and protects them from dust and dirt. Such casing leaves no parts exposed except the operating handle 4 for the tape marking mechanism, an opening to receive the identifying members and an opening to receive the unlocking key 5.

Figures 1, 2, 3:
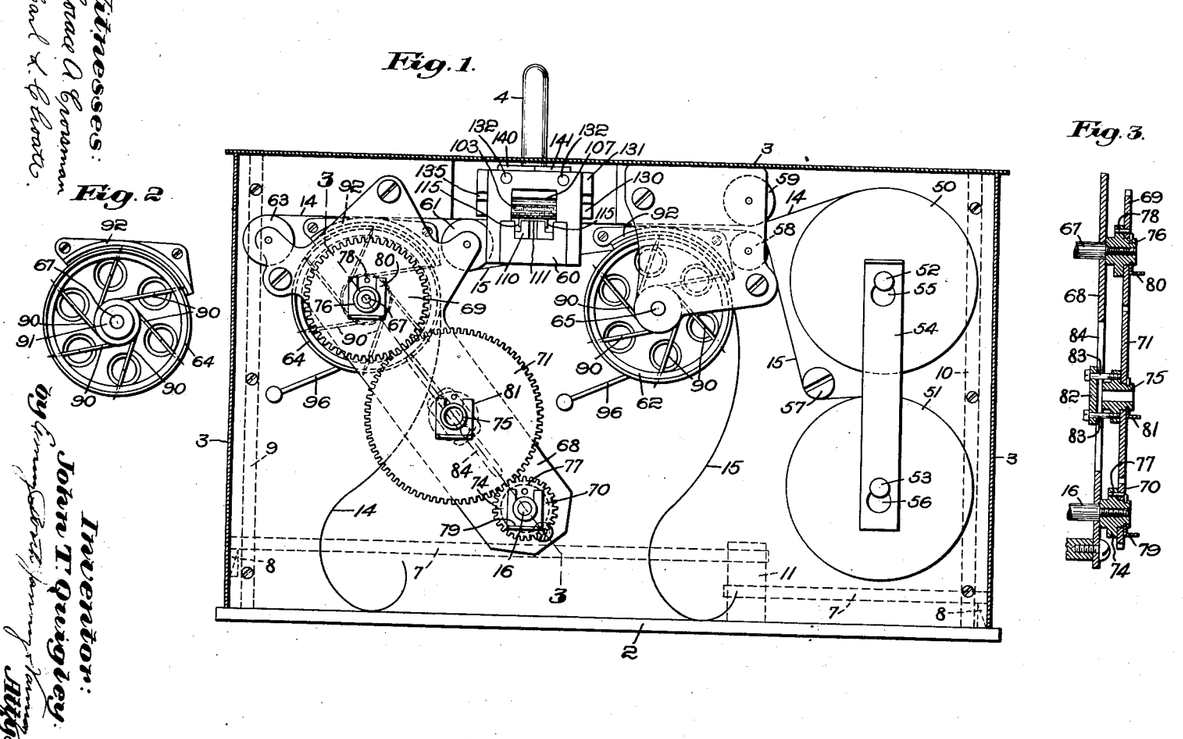
Figure 1 is a side elevation of a measuring and recording device embodying one form of the invention, the casing being cut away in section to show the tape feeding parts.
Fig. 2 is a side elevation of a tape feeding drum.
Fig. 3 is a sectional elevation on the line 3—3 of Fig. 1 showing the driving gears for the tape feeding drum.
Figure 2:
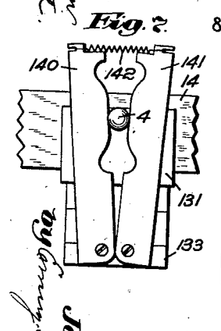

The casing is positioned on the base by means of the five studs 6 and is locked in position by the spring-pressed bolts 7 (Figs. 1, 9 and 10), the end of each of which is caused to snap in above a beveled lug 8 on the interior of the casing and lock the latter to the base when seated thereon. The bolts 7 are mounted to slide at their outer ends in the transverse plates 9 and 10, respectively, and at their opposite ends in the block 11 transversely arranged on the base 2. The bolts are pressed outwardly by springs 12, but may be retracted to unlock the casing by means of the locking key 5 which can be inserted in the block 11 through an opening in the cover. The key has a shank provided with a toothed end 13, the latter engaging teeth cut in the ends of the bolts (Fig. 10) so that by turning the key the casing may be unlocked.

Figures 4, 4A, 5:
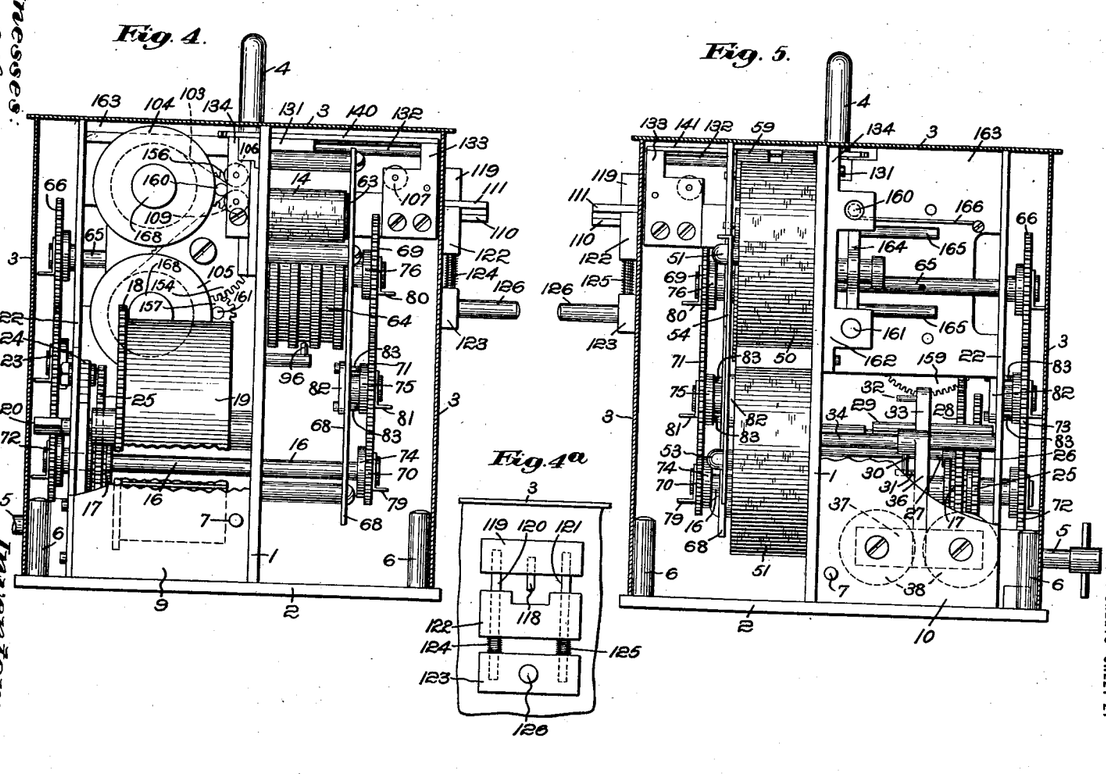
Fig. 4 is an end elevation of the machine shown in Fig. 1 with the casing cut away in section.
Fig. 5 is a similar end elevation showing the opposite end of the machine.
Figures 6, 8:
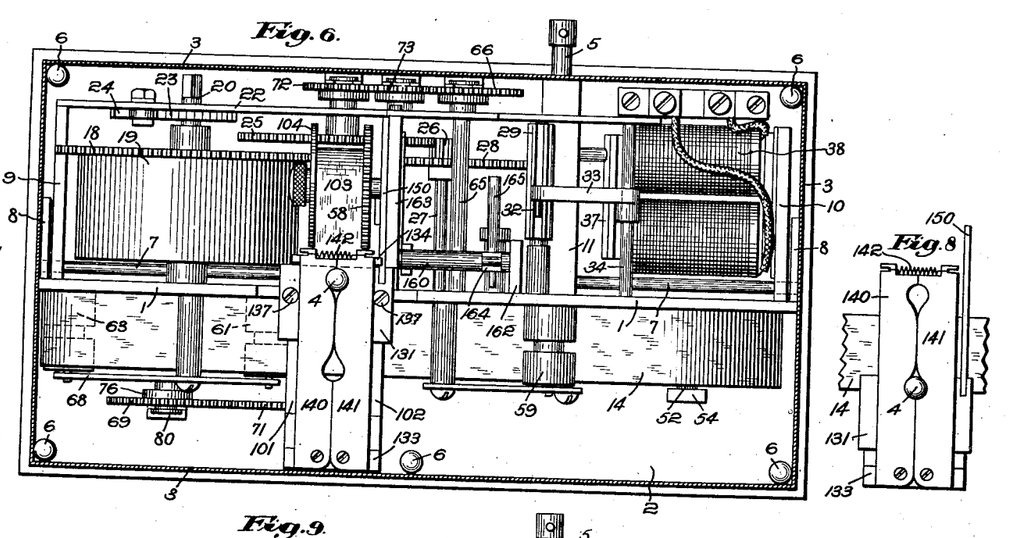
Fig. 6 shows the machine in plan, the casing being in section.
Fig. 8 is a similar view showing the marking slide on completion of its movement.
Figure 9:
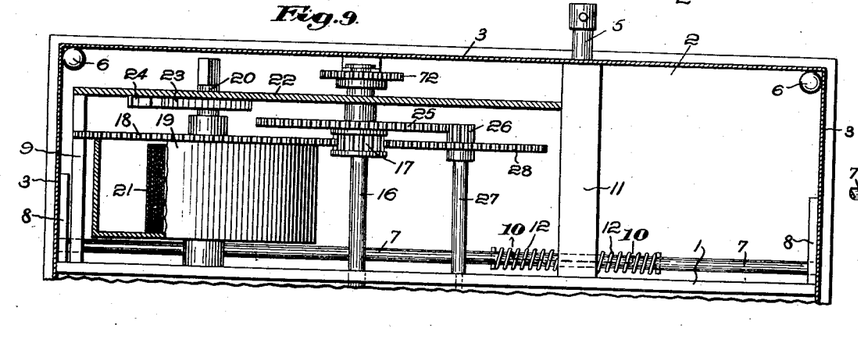
Fig. 9 is a plan view of one side of the machine showing the locking bolts for the casing.
Figure 10:
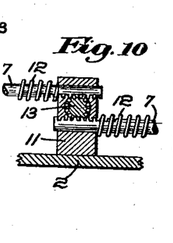
Fig. 10 is a section in elevation on the line 10—10 of Fig. 9.

Two continuous strips of paper tape 14 and 15 are positively and accurately fed past marking devices beneath the handle 4. The rates of feed are determined by conditions already briefly referred to and hereinafter more fully explained. Each record tape is fed by similarly constucted feeding devices, but at rates which may be differentiated by adjustable gearing trains from the common, feed-tape, driving shaft 16 (Figs. 4 and 9). The latter is driven at a rate proportional to elapsed time by any suitable mechanism. Independent clock mechanism may be provided for this purpose within the casing, but where, as is usual, a number of the machines are employed in any one installation, I prefer simultaneously to move the tape feed mechanisms of all machines through the use of a master clock. In the form of the invention shown, therefore, each machine is provided with a spring motor which turns the shaft 16 under the control of an escapement, the latter being caused to act at regular time intervals by means of an electro-magnet controlled by the master clock.

Figure 11:
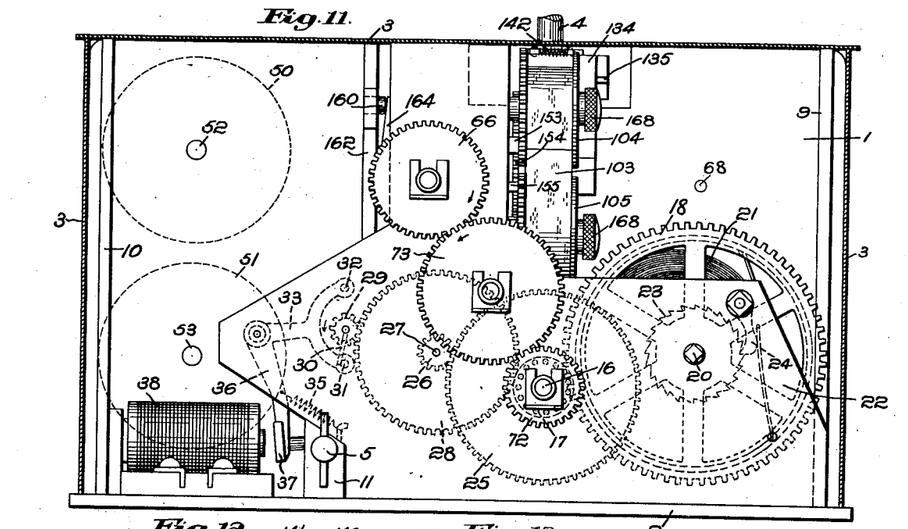
Fig. 11 is a side elevation of a machine looking at the opposite side from that shown in Fig. 1.

Referring more particularly to Figs. 9 and 11, the tape feeding shaft 16 carries the small pin gear 17 through which it is turned by the large gear 18 attached to the spring drum 19. The drum is loose on its shaft 20 and is turned by the coiled spring 21, one end of which is secured to the drum and the other end to the shaft 20. One end of the drum shaft is journaled in the plate 1 and the opposite end in a parallel upright plate 22. The spring is prevented from unwinding by means of the ratchet 23 and the pawl 24 mounted on the plate 22. The squared end of the shaft 20 permits the application of a spring winding key to wind the spring when the cover is removed.

Any desired feeding interval may be adopted. For ordinary purposes a movement of the tapes once for each minute is sufficient. An escapement controls the shaft 16 by means of the large gear 25 fixed thereon, which gear meshes with the small pinion 26 carried on the shaft 27 (see Figs. 6, 9 and 11). The shaft 27 also has the large gear 28 meshing with the escapement pinion 29. The latter under the spring 21 tends to turn in the direction of the arrow shown in Fig. 11. The pin 30, projecting radially from the pinion, normally prevents movement thereof by striking against one of the two laterally disposed pins 31 or 32, which latter are carried by opposite members of the bifurcated arm 33 of a bell crank lever mounted on the pintle 34. The lever is normally held in the position shown in Fig. 11 by the spring 35 engaging the opposite arm 36 of the lever. The arm 36, however, carries an armature 37 which is adapted to be attracted by the magnet 38. When attracted the pins 31 and 32 are depressed, releasing the pin 30 and allowing the escapement pinion to make one half a turn until the pin 30 strikes the pin 32, which latter has been brought into its path by the movement of the escapement lever. On deënergization of the magnet the lever returns to its normal position, allowing the escapement pinion to make another half turn. Connections are made to the magnet through the bottom of the casing with conductors leading to a master or controlling clock so that, by sending a single impulse once for each minute from the master clock, the escapement pinion for each one of the group of measuring devices is given one full turn for each minute and the tape feeding shaft is caused to move a fixed, predetermined amount.

Referring now to the devices for holding and positively feeding the tapes, the latter are best shown in Figs. 1, 2, 3, 11, 15 and 17. The continuous tape strips 14 and 15 are supplied from rolls 50 and 51 mounted one above the other to turn on the studs 52 and 53, respectively, fixed in the plate 1. The rolls are held in position by the plate 54 having openings 55 and 56 which fit over grooves in the ends of the studs. The openings are enlarged at the bottom so that the plate may be lifted and slipped over the ends of the studs for replenishing the rolls.

The tape 15 passes under the guide roller 57 and over the roller 58 and thence under the tape 14 which is led beneath the guide roller 59. The two tapes, one directly above the other, then pass between the printing devices which are carried on the supporting block or bed 60, the tape 15 passing over the guide roller 61 and thence back to its feeding drum 62, and the tape 14 passing over the guide roller 63 and thence to its feeding drum 64.

The drum 62 is secured to and driven by the shaft 65. The latter extends (Fig. 5) through the plate 1 and the supplementary plate 22. On the outside of the latter the shaft carries the driving gear 66 (Figs. 4, 5 and 11). The drum 64 is driven by a similar shaft 67 journaled in the plate 1 and the plate 68 (Figs. 1 and 4) and having its driving gear 69 (Fig. 3) on the outside of the plate 68 at the opposite side of the machine from the gear 66 for the drum 62.

The gear 69 is driven from a pinion 70 (Figs. 1 and 3) on the tape feed shaft 16 through an intermediate gear 71. The gear 66 at the opposite side of the machine (Figs. 5 and 11) is driven from a pinion 72 at the opposite end of the shaft 16 through the intermediate gear 73. The gear trains 72, 73 and 66 on the one hand, and 70, 71 and 69 on the other hand, both constitute adjustable trains whereby the feed of each tape may be independently adjusted to suit different rates of time cost.

Both gear trains and both tape feed drums are substantially alike in construction so that the gear train and drum for the tape 14 only will be described in detail, it being understood that the construction of the corresponding devices for the tape 15 are in substance the same. To facilitate changing the gear train the gears 70, 71 and 69 (see Figs. 1 and 3) are removably mounted upon hubs provided by the gear carriers 74, 75 and 76, respectively. The carriers 74 and 76 are each screwed on to the threaded end of the respective shafts 16 and 17 so as to turn therewith. The carriers provide seats for their respective gears and have fixed lateral pins 77 and 78. The gears are drilled to receive these pins and when slipped in position are held thereby to rotate with their carriers. Bifurcate spring clips 79 and 80 are employed to hold the gears axially on their carriers, the clips being slipped over grooves in the ends of the carriers which project beyond the gears. By removing one of the clips 79 or 80 either gear may be quickly removed and replaced by another.

The gear 71 is freely rotatable upon its carrier 75, a similar clip 81 being provided removably to hold it in place. The carrier 75 is secured to a plate 82 at the back of the supporting plate 68 by means of screws 83 which pass through a longitudinal slot 84 in the plate, this construction permitting the carrier to be differently positioned to accommodate gears of different sizes. The intermediate gear 73 of the other gear train is adjustably mounted in a similar manner on the plate 22.

Since the accuracy of the record depends upon the accuracy of the tape feed, it is necessary that the tape should be fed without slippage or creeping. For this purpose the circumference of the tape drum 64 is constructed so as to give exactly the required travel to the tape for each revolution of the drum, due allowance being made for the thickness of the tape. It is necessary that the tape should contact with the drum in closely fitting relation and that positive feeding means should be employed.

In the present case the tape is fed positively (Figs. 2, 15 and 17) by means of a series of feeding members 90, herein six in number, distributed at equal intervals around the circumference of the drum. While a single series of feeding points might suffice, preferably a double row or series (see Fig. 17) is employed so that they occur in pairs side by side. This not only insures a positive feed but keeps the tape alined and prevents it from twisting on the drum. These are in the form of needles presenting very fine points projecting through the shell of the drum and above its surface for a sufficient distance only to insure impaling the tape. Herein the inner ends of the needles are fixedly secured to the hub 91 of the drum in tangential relation so that the points incline slightly forward in the direction of drum rotation in a position securely to grip the tape when impaled. The relation, however, is such that there is no tendency to lift or advance the tape relatively to the drum, the former preserving at all times its closely fitting relation to the drum. The number and relation of the feeding points is preferably such that at least two pairs are always engaged with the tape.

To preserve the close fitting relation of the tape to the drum and to permit the feeding points to impale the tape without lifting it or advancing it on the drum, means is provided, such as the segmental guard 92, fixed on the plate 1 which overlies the tape or a portion thereof where it is wrapped about the drum. Preferably the guard overlies the tape at or about the place where it is first impaled by the feeding points. As shown in the drawings the guard is longitudinally grooved at 93 and 94 in the plane of the needle points so that the latter, after impaling the paper, may travel through the grooves. At the sides of each groove, however, the walls of the guard approach very closely to the periphery of the drum, leaving only sufficient room for the paper and a slight additional allowance. To prevent pinching the paper the drum is preferably provided with circumferential grooves 95 directly opposite the three closely fitted portions of the guard. This construction permits the paper to pass freely about the drum and between the drum and the guard and causes it to be impaled by the feeding points without any danger of its buckling or lifting from the drum.

The tape as it leaves the feeding drums passes into the lower part of the casing of the machine. To prevent any tendency for the tape to cling to the drum, fixed stripping fingers 96 are employed having beveled ends which enter the middle groove 95 and act to strip the tape from the drum should the tape adhere to the latter.

A suitable selection of the linear scale leads to a very simple system for changing the tape feed gears to accord with different cost rates. Preferably the linear scale adopted is such that the linear space occupied by one hundred value units is equal to the diameter of the tape feed drum multiplied by 3.1416 or some multiple or divisor thereof. Herein the unit of value is designed on the scale by a space equal to .06283 of an inch. Thus, in the illustrative case the linear scale (see Fig. 20) is marked off in one hundred units for every 6.283 inches. This permits the use of a feed drum having a circumference exactly equal to some divisor or multiple of one hundred units of the adopted scale whereby one complete revolution of the drum will feed a length of tape representing exactly one hundred units of value or the selected divisor or multiple thereof. Thus, in the illustrative case, the feed drum being one and one-half inches in diameter and one hundred linear scale units,—6.283 inches—being the circumference of a circle two inches in diameter, there is fed for each revolution of the feed drum a length of tape having a value, as measured on the scale, of three quarters of a dollar or seventy-five cents. This permits the tape feed to be varied to accord with divers rates by substituting for the gear 70 a gear having teeth corresponding in number to the number of cents in the cost rate. That is to say, for a cost rate of thirty-seven cents the gear 70 would have thirty-seven teeth; for a cost rate of forty cents, forty teeth, and so on. Precisely the same simple principles of rate adjustment may be applied to linear and value units of any denomination or kind and any desired fractional parts of the value unit may be employed as the cost rate by merely changing the number of teeth in the gears 70 or 69.

Referring now to the devices for printing or marking the tape, I provide a relief plate whereon the printing characters are exposed in relief with a very slight clearance, such for example, as may be obtained by embossing a thin piece of sheet metal, and provide means whereby a clearer impression may be obtained from such plate with the aid of an inking ribbon or other ink vehicle combined with very simple appliances.

This is accomplished by placing the tape or other record sheet and an ink-saturated fabric, or other ink vehicle, such as an inking ribbon, in superimposed relation to a printing plate, causing a pressing member to exert thereagainst a relatively slight pressure over a relatively small area and then moving the pressing member over successive portions of the printing surface. Such action may be obtained by causing a wiper under pressure to wipe over successive portions of the paper and inking ribbon where they face the printing characters. The area of pressure between the wiper and the paper is preferably made to approximate as nearly as possible that corresponding to a single line of contact. A traveling pressure of this kind gives results which cannot be obtained either by a pressure applied uniformly and simultaneously to all parts of the printing surface or by the action of a member striking the ribbon such as the action of a type bar in a typewriter.

The wiping pressure takes the ink out of the ribbon and applies it cleanly to the paper. It does this irrespective of irregularities and imperfections in the printing characters, since it appears to sink the paper and ribbon alike into characters having either high or low relief.

In applying this system of printing to the described type of machine, the block 60 which overhangs from the upright plate 1 constitutes a bed plate for the printing devices. The tapes 14 and 15 (Figs. 15 and 16) pass transversely between the bed plate 60 and the overlying guide strips 101 and 102. An inking ribbon 103 is positioned transversely the tapes and longitudinally the block 60, being caused to pass under the tape 14 and thence back under the tape 15 directly over the printing surface. The ends of the ribbon are carried by the spools 104 and 105 (Fig. 4). From the upper spool 104 the ribbon passes beneath the guide roller 106 and thence beneath the tape 14 and the guide roller 107 to and about the guide roller 108 near the end of the block 60. Thence is passes back beneath the tape 15 and over the guide roller 109 to the lower winding spool 105. Suitable ribbon feeding devices hereinafter described, are employed for automatically moving the ribbon.

Herein the printing characters are presented by members which are removably inserted in the machine between the bed plate 60 and the lower part of the ribbon. These comprise the workman's identifying member in the form of a plate 110 (Fig. 19), bearing printing characters in relief which identify the workman or the production unit for which the record is made and the work identifying tag 111 (Fig. 18) which bears characters identifying the work or operation to which the cost is to be charged. Additional printing symbols or characters may be employed for any desired purpose, either upon one of the removable members or upon some fixed part of the machine, but, for ordinary cost recording purposes, the ones shown are sufficient.

The workman's identifying plate 110 is of such shape that it can be slid through an opening in the side of the casing 3 provided for that purpose and into a seat provided in the bed plate 60. There it is positioned and held by the pin 112 (Fig. 16) fixed transversely in the block 60, the identifying member having a beveled foot 113 which seats under the pin 112. In this position the raised printing characters 114 on the identifying member (herein shown as the numerals "234") are located beneath and adjacent the edges of the tapes 14 and 15.

Figures 15, 16, 17, 18, 19:
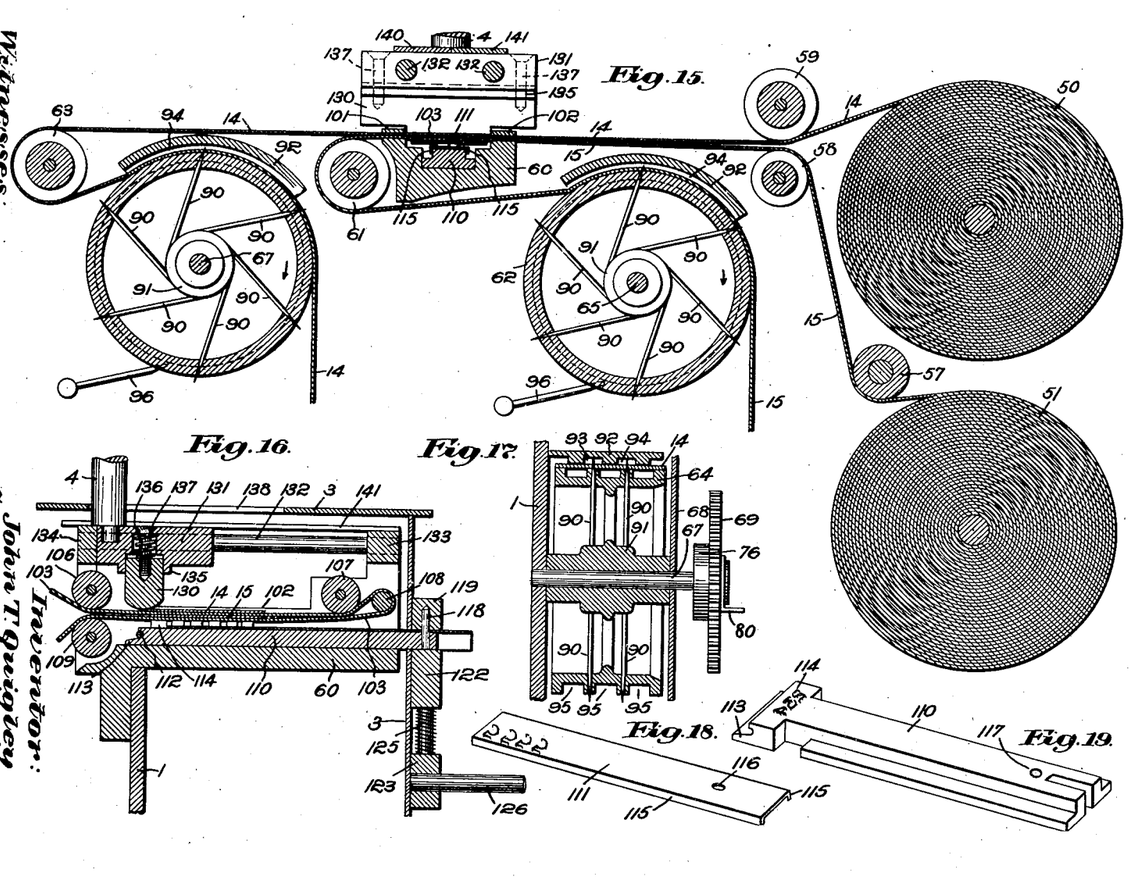
Fig. 15 is a section in elevation on an enlarged scale showing the tape feeding and tape marking devices, the tape, ribbon and type being shown of exaggerated size for the sake of clearness.
Fig. 16 is a section in elevation taken transversely through the tape marking devices in Fig. 15.
Fig. 17 is a transverse section in elevation showing one of the tape feeding drums and its guard.
Fig. 18 shows the work identifying tag.
Fig. 19 shows a workman's identifying plate.

The top of the identifying plate 110 is flat and shaped to receive the work tag 111. The latter is formed of thin sheet metal of U-shaped cross section having the sides 115 which fit over the sides of the identifying member 110, as shown in Fig. 15. This permits the tag to be inserted in the machine upon the plate 110 as a seat and withdrawn from the machine either separately or with the said plate. The two together form a printing surface with the workman's identifying number and the work number in relief at substantially the same elevation and in such relation that they are impressed upon the tape in the manner indicated in Fig. 21.

It has been found that the described ribbon printing devices permit the use of a thin sheet metal work tag with the numbers roughly embossed thereon by steel dies. The relief may not be more than six or eight thousandths of an inch. This permits these tags to be made in large quantities of cheap sheet metal and in automatic machines which emboss the numbers serially on consecutive tags. Fabrics other than woven ribbons may be employed as the inking vehicle and in other than ribbon form. For example, carbon paper may be employed as the inking vehicle.

Any suitable means may be employed to hold the printing members in position when inserted in the machine. Herein (Figs. 4 and 4ᵃ) the work tag is perforated at 116 to register with a perforation 117 in the printing member 110 to receive a pin 118 (Figs. 4ᵃ and 16) the pin being carried by the removable block 119. The block is secured to guide pins 120 and 121 which are guided in the fixed block 122 and are secured at their lower ends to the plate 123 between which and the fixed block 122 there are provided springs 124 and 125 to cause the normal depression of the plates 123 and 119. To insert the tag and identifying member the pin 118 is lifted by lifting the pin 126 extending laterally from the plate 123. This lifts the plate 123 and block 119 compressing the springs 124 and 125. The identifying member and tag being then inserted, the pin will enter the perforations 116 and 117 and lock the two members in position as soon as the pin 126 is released. The perforation 116 also permits the tag to be readily fastened to the material to which it pertains.

To provide the traveling pressure when an impression is required from the printing characters upon the tape, there is provided the wiper block 130 which is supported in the slide 131. The slide is mounted to slide on guides 132 secured at one end to an upright support 133 at the outside of the bed plate 60 and at the opposite end on an upwardly projecting portion 134 of the said plate. To provide a downwardly yielding pressure on the wiper block the latter has a slight up and down movement between depending ears 135 on the bottom of the slide. Seated in the slide above the wiper are a pair of coiled springs 136 encircling the screws 137 which are threaded into the top of the wiper so that the wiper is constantly pressed down toward the upper paper tape. The lower surface of the wiper is preferably rounded, as shown, to reduce the area of contact with the paper. The top of the slide has the upwardly extending handle or pin 4 which projects through the slot 138 in the casing. In making a record the pin is moved from one end of the slot to the other, causing the slide to move lengthwise the guides and sweep the wiper transversely the tape and lengthwise the ribbon, thereby making the desired impression of the printing characters on the tape.

To insure the complete wiping movement of the wiper across the plate the pin 4 works between the two plates 140 and 141 (Figs. 6, 7 and 8) which are pivoted on the top of the support 133. The edges of these plates are normally drawn into contact by the spring 142, but the plates are cut back, as shown in the drawings, at points corresponding to the extreme positions of the pin 4, so that the latter in its extreme positions fit between the two plates. Movement of the pin in either direction to make an impression on the tape is resisted by the spring 142. Force sufficient to move the pin and spread the plates apart, as shown in Fig. 7, is also sufficient to carry the pin to its opposite position, that is to say, from the point shown in Fig. 6 to that shown in Fig. 8, or vice versa in whichever position the pin has been left in making the preceding record. One movement in either direction is sufficient to make the required impression.

Figure 14:
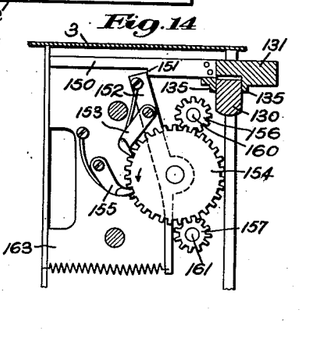

Any suitable ribbon feeding means may be employed, but herein the ribbon is advanced slightly for each alternate printing movement of the wiper. To provide for this movement the wiper slide 131 (see particularly Figs. 6, 12, 13 and 14) carries the rearwardly projecting finger 150. The shoulder 151 is adapted to strike the upper end of a pawl lever 152 prior to the completion of the back movement of the wiper. The lever 152 carries the feeding pawl 153 which is spring-pressed into engagement with the teeth of the ribbon feed gear 154. The gear is normally held fixed by the locking pawl 155, but is advanced one step in the direction of the arrow (Fig. 14) by each feeding movement of the pawl 153. The gear 154 meshes with the two pinions 156 and 157. The pinion 156 is adapted to mesh with the gear 158 which is secured to the ribbon spool 104 and the pinion 157 is adapted to mesh with the gear 159 which is secured to the ribbon spool 105.

The pinions 156 and 157, however, are mounted to turn upon axially movable pins 160 and 161, respectively, and the teeth are wide enough so that by an axial movement they may be thrown into or out of mesh with their respective gears 158 and 159, while always remaining in mesh with the feed gear 154. The pins 160 and 161 are supported for sliding movement at one end in the bracket 162 and at the opposite end in the plate 163 which supports the spools. They are connected to opposite ends of the pivoted lever 164. The lever is provided with the laterally projecting pins 165 so that by means of the pins the lever may be rocked and the pins 160 and 161 moved in opposite directions so as to engage the pinion 156 with its gear 159 and vice versa.

Figures 12, 13:
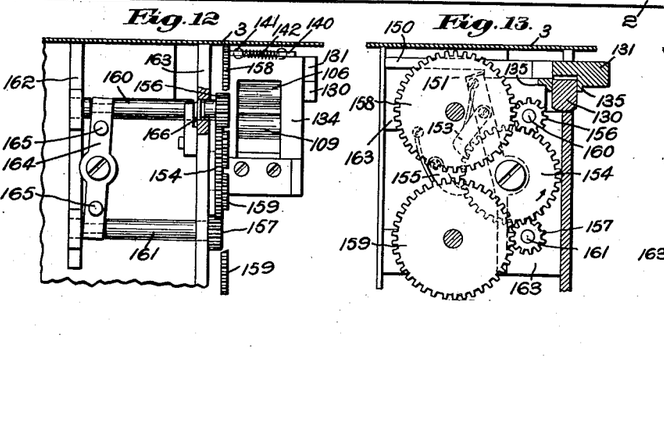
Figs. 12, 13 and 14 show details of the feeding and shifting mechanism for the inking ribbon.

With the parts in the position indicated in Fig. 12 the pinion 156 meshes with the gear 158 and the pinion 157 is disengaged from the gear 159 so that with each movement of the feeding pawl the spool 104 is incrementally moved to wind up its end of the ribbon, the same amount of ribbon being drawn off from the freely turning spool 105. The ribbon feed will need to be reversed but infrequently. When reversal is required the lever 164 is rocked about its pivot to engage the pinion 157 with the gear 159 and wind up one ribbon on the lower spool 105. The pin 160 has two circumferential grooves, as shown in Fig. 12, adapted to be engaged one or the other by the spring wire 166 (Figs. 5 and 12) to position the lever 164. The spools 104 and 105 are carried upon removable studs 167 and 168, respectively.

The recording machine above described produces a record which is made synchronously with the passage of the time being recorded. The latter is represented in the record by the dimensions of a physical thing, *i. e.* the length of the tape. While it may be applied to a great variety of uses, its use will now be described as a cost recorder to assist in computing the cost of operations into which time enters as a factor.

Figures 20, 21, 22, 23:
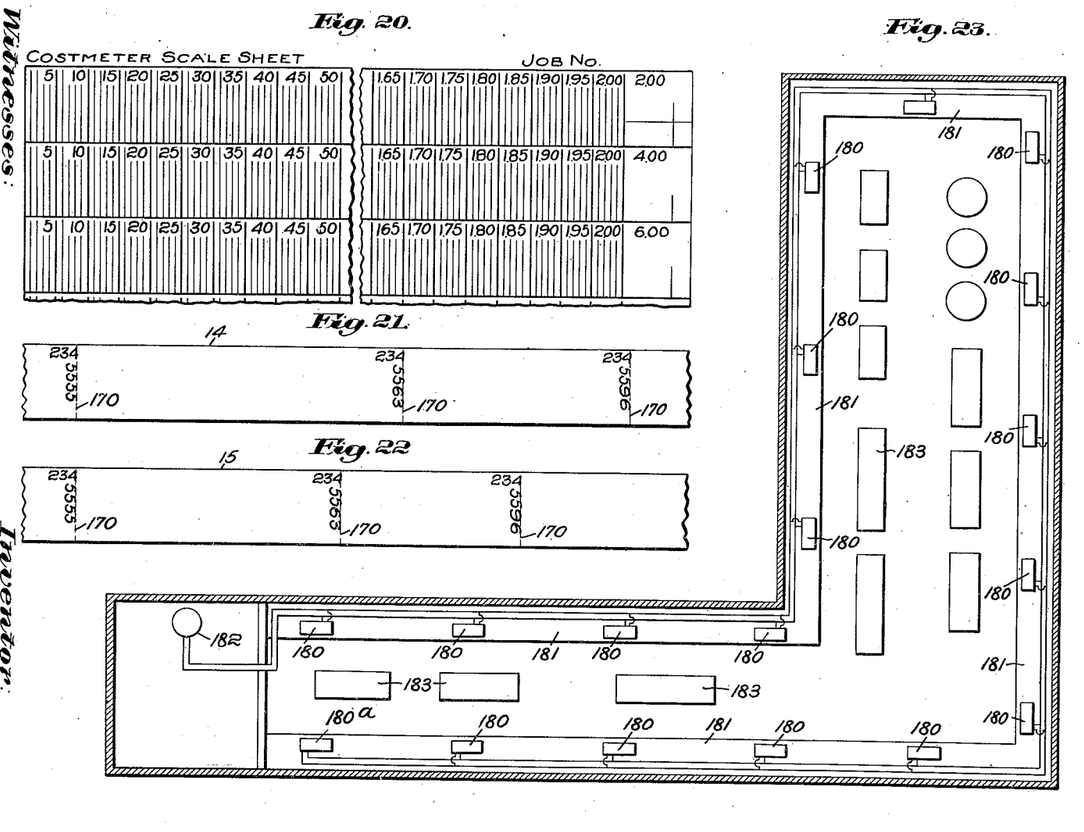
Fig. 20 shows in full size plan a portion of a scale sheet.
Fig. 21 is a detail plan, full size, of an illustrative example of a portion of the total cost tape.
Fig. 22 is a detail plan, full size, of an illustrative example of the wage cost tape for the same operations as are recorded upon the tape of Fig. 21.
Fig. 23 is a plan view showing diagrammatically the arrangement of a shop or workroom equipped with recording devices of the type described.

In the common use of the described apparatus one machine is assigned to each operative and is located at his place of work. Fig. 23 represents a typical workroom where eighteen recorders 180 are shown installed one for each of eighteen different workmen and are placed upon the workbench 181 each near the corresponding workman. These machines 180 are electrically connected with a common master clock 182 which acts simultaneously to complete the escapement-actuating circuit through the entire series once for each minute. Preferably, also, the master clock is provided with means for transmitting these impulses only during the assigned work periods, the record tapes being fed, therefore, only during work periods when elapsed time represents money cost. Thus, if the work periods are between the hours of eight a. m. and noon, and one p. m. and five p. m., the record tapes will be fed during those hours only and at other times will be at rest.

The rate of tape feed for each particular machine as regards the wage record will be so regulated or adjusted by some authorized person, through adjustment of the gearing train in each particular machine, as to accord with the wage rate of its respective operative. If the wage rate is changed or the machine used by a different workman having a different wage rate, the rate of feed will be changed accordingly, the adjustment being easily made. On the other hand, the rate of feed for the total cost tape will be adjusted to accord with the total time cost of the operation being performed. The total time cost will consist of the wage cost plus the overhead cost. The latter, including, as it does, such factors as rent, administrative and clerical expenses, up-keep, superintendence, taxes, investment and depreciation, etc., can readily be calculated in advance for any given time period, taking into account the machinery, tools and equipment which are maintained for the operations to which they are adapted. Thus, if the workman to whom the recorder 180ª has been assigned is working upon a machine 183, which may be a planing machine, printing press or any other kind of machine, the feed of the total cost tape in the recorder 180ª is set to accord with the total cost per hour of the operation upon said machine including the wage rate of the workman and the overhead cost. The overhead cost will have been previously calculated in advance for any production unit, the production unit in this case consisting of the workman, the machine and such equipment as is required in its operation.

When the workman is given a certain piece of work to do, that work is assigned an arbitrary number and he is furnished with a work tag similar to the tag 111 bearing the assigned number, such tag accompanying the material on which the work is to be performed. When he starts work at the beginning of the work period he inserts his own identifying tag and moves the marking pin to mark the tape with his personal identification number and the work number.

The upper edge of the work numerals forms an imaginary datum line from which the linear record starts and along which the lengths of tape may be subsequently severed one from another, as indicated by the dotted lines 170 in Figs. 21 and 22. If desired the tape may be marked with a special datum line, as by a transverse line or perforation, but for ordinary purposes the linear dimension can be accurately measured by reference to the aforesaid edge of the work number.

During the time the workman is engaged upon the work the tapes are traveling along past the marking devices. When the job is completed the workman removes the work tag from the machine, turns in the material with its tag, gets a new job with its work tag, places the latter in the machine and moves the printing pin 4 to print the new job number showing a new datum line and printing his own identifying number in the margin. There now exists within the machine a record consisting of two sections of tape marked at each end by a datum line and having the job number and the workman's number marked at one end. These sections of tape are of different lengths, one representing on the linear value scale the total cost incident to the work performed during the elapsed time period, and the other the wage cost.

At the close of the work period the workman will mark another datum line on the tape and if he has been engaged upon different operations there will be two lengths of tape, which will have passed the marking devices representing the cost of the elapsed time, but subdivided each into different lengths representing each length the time cost of the corresponding operation and each marked with characters identifying the job and the workman, one tape representing on the value scale the wage time cost and the other the overhead time cost.

The winding of the spring, adjustment of the tape feed gears, replenishment of the tape, removal of the tape which has been fed, renewing the inking ribbons and like care of the various recording machines will, of course, be attended to by the foreman of the department or some other authorized person.

At the end of the day or at the close of any other desired period, the tape which has been fed may be removed from the machine and can serve the basis of any desired investigation into time cost. To ascertain the total time cost of a given job the aggregate length of tape fed in all the recorders and identified with that job number is measured by the linear scale. As a convenient method of ascertaining the aggregate length, the total-cost tapes from all the recorders may be severed along the established datum lines, and all tape sections identified with that particular job number, then collected and mounted upon the scale sheet in such a way that they are assembled one after another to form a continuous strip in horizontal rows. The first row having been exactly filled, the excess tape is then carried over into the second row, and so on. Each row may represent some selected unit of money, as for example, two dollars, and the scale may be graduated into smaller units, as for example, cents, so that the total value represented by the tape, and therefore, the total time cost for that particular job as it is carried up to the completion of the record, may be readily ascertained by reading off the value denoted on the scale at the termination of the tape.

Tapes of different colors may be used, a distinctive color being devoted to different classes of operations or machines and the different colors be separately mounted on the cost sheet. By this means the total time cost in a given job of the different operations may be separately ascertained. For example, in a printing establishment the time cost of composing may be recorded upon a blue tape, presswork upon a red tape, binding upon a yellow tape, and so on. This enables the eye quickly to perceive the relative costs of the different operations, as well as the total cost of the job.

The wage cost tapes of any given workman may be measured by means of the adopted scale to ascertain the wages due, or the wage cost tapes of any given job may be assembled to ascertain the labor cost of that job, or any other desired use may be made of the wage cost record.

By means of the numbered work tags it is possible to record the cost of the time which the workman is obliged to employ in unproductive work such, for example, as repairs upon machinery, waiting for an assignment of work, or the distribution of material or tools. When obliged to change the nature of his work, because of the completion of the job, or for lack of instructions, or because of breakage, repairs, or for any other reason, he indicates the end of the first period and the beginning of the second by marking the tape with an appropriate designation. To this end the workman may be provided with tags similar to the tag 111 provided with numbers or symbols indicating the nature or cause of the unproductive time. The workman puts this tag into the machine and marks upon the tape the symbol indicating the nature of the unproductive time so that the record is made corresponding to such time. By this means all time may be accounted for and its cost charged to the proper cause.

The workman will be required to make a record when he takes his position at the beginning of the work period and subsequently when he leaves his position at the close of the work period. The intervening length of tape represents the cost of the time when he is present and any excess of tape fed prior or subsequent to such markings represents in time cost that portion of the work period when the workman is absent. The length of tape intervening between the extreme marked portions will of course be separated into lengths identified with the different jobs as described.

The recording mechanism is all inclosed and hence inaccessible to the workman so that not only is he prevented from tampering with the machine, but in addition, he can see nothing which will give him any indication of the amount of time recorded against a certain operation. Throughout the entire work period a record is being produced synchronously with the passage of the time being recorded, which record is invisible to the workman, but upon which he must record the nature of his work or lose the chance for subsequently doing so. The record once made cannot be recalled or changed.

I do not herein claim the specific details of the tape feeding mechanism alone, these being claimed in my copending application Serial No. 800,424.

While I have herein shown and described for purposes of illustration one specific form of the invention, it is to be understood that extensive deviations may be made therefrom without departing from the spirit thereof.

Claims.

1. In a measuring instrument, the combination with means for holding a continuous record sheet, a feed drum, means for turning the same at a rate proportional both to elapsed time and time cost rate, impaling points projecting from the feeding surface of the drum adapted to impale the sheet, a guard extending for a substantial distance over the feeding surface of the drum to place the sheet into close fitting relation with the surface thereof and the impaling points, and means for indicating on said surface the beginning of a time period.

2. In a measuring instrument, the combination with means for holding a continuous record sheet, a feed drum, means for turning the same at a rate proportional both to elapsed time and time cost rate, impaling points projecting from the feeding surface of the drum at a forward inclination with reference to the direction of drum rotation, and adapted to impale the sheet, a guard extending for a substantial distance over the feeding surface of the drum to place the sheet into close fitting relation with the surface thereof and the impaling points, and means for indicating on said surface the beginning of a time period.

3. In a measuring instrument, the combination with means for holding a continuous record sheet, a sheet feeding drum, impaling points projecting from the surface thereof, a segmental guard plate arranged to press the sheet closely against the drum and provided with grooves to permit the passage of the impaling points, clock-controlled mechanism for driving the drum at a rate proportional to elapsed time and the time cost rate, and means for indicating on the surface of the sheet the beginning of a time period.

4. In a measuring instrument, the combination with means for holding a continuous record sheet, a sheet feeding drum, impaling points projecting from the surface thereof, a segmental guard plate arranged to press the sheet closely against the drum and provided with grooves to permit the passage of the impaling points, said drum being provided with one or more circumferential grooves alternating with a groove or grooves in the guard plate, clock-controlled mechanism for driving the drum at a rate proportional to elapsed time and the time cost rate, and means for indicating on the surface of the sheet the beginning of a time period.

5. In a measuring machine, the combination with means for holding a record sheet, means for indicating on the surface thereof the beginning of a time period, a feeding drum for said sheet provided with impaling points projecting from the surface thereof, means extending circumferentially for a substantial distance about the drum for pressing the sheet toward the drum on each side of the impaling points, and clock-controlled mechanism for driving the drum.

6. In a recording machine, the combination with means for holding a continuous record sheet, a sheet feeding drum having an accurately dimensioned feeding surface, impaling points projecting from said surface, circumferential depressions in the feeding surface of the drum, means positioned opposite said depressions for pressing the sheet into closely fitting relation with reference to the said drum, means for indicating on the surface of the sheet the beginning of a time period and clock-controlled means for driving the drum.

7. Means for recording the time cost of different operations under different rates comprising the combination of a plurality of measuring devices having each a record carrier for holding a record surface, means for feeding said surface relative to a certain point in the machine, the rate of feed in each case being proportional both to elapsed time and to the value of elapsed time for the operation performed, a common linear scale of money value whereby the length of record surface fed with relation to the fixed point for each operation represents on the linear scale the money value of the elapsed time, and a removable sheet metal identification member having printing characters embossed on its face and adapted when placed in the machine to cause said characters to be placed upon the length of record surface fed for the operation performed, and provide a transverse datum line on said surface to provide for the severance of said length therefrom.

8. Means for recording the time cost of different operations under different rates comprising a plurality of measuring machines having each a record carrier for holding a record surface, means for feeding said surface relatively to a certain point in the machine, the rate of feed in each case being proportional both to elapsed time and to the value of elapsed time for the operation performed, a common linear scale of money value whereby the length of record surface fed with relation to the fixed point for each operation represents on the linear scale the money value of the elapsed time, a sheet metal identification tag adapted to accompany the work and identify the same, but having printing characters thereon, a seat provided in the machine to receive the tag and hold the same in printing relation to the record surface, ink transfer means, and a movable pressor adapted to be moved across the record sheet to press successive portions of the record surface against the identification member.

9. Means for recording the time cost of different operations under different rates comprising the combination of a plurality of measuring machines having each a record carrier for holding a record surface, means for feeding said surface relatively to a certain point in the machine, the rate of feed in each case being proportional both to elapsed time and the value of elapsed time for the operation performed, a common linear scale of money value whereby the length of record surface fed with relation to a fixed point for each operation represents on the linear scale the money value of the elapsed time, and means for placing identification marks upon the length of record surface fed for the operation performed, said means comprising a removable sheet metal identification member having printing characters thereon and adapted to be placed in the machine in printing relation to the record surface, ink transfer means, and a bed plate provided in the machine for the tag, said bed plate being removable and also bearing printing characters to identify the work.

10. A recording machine having means for holding therein an impression sheet, means for holding an inking member in contact therewith, a removable identification member comprising a sheet metal tag having printing characters thereon and adapted to be placed in printing relation to the sheet, and a bed plate in the machine for the tag, said bed plate being also movable and bearing printing characters.

11. The combination with an identifying member for a recording machine consisting of a plate having printing characters thereon, of a second identifying member for the said machine having a seat for said plate and printing characters located adjacent the seat for said plate and of a height to accord with those on the said plate when the latter is in position.

12. A recording machine having a casing, a tape carrier in said casing, feeding means for the tape, an inking vehicle, a relief printing plate in printing relation to said tape and an inking vehicle, a pressor, means for positioning said pressor normally at the side of the tape, and a handle projecting from the casing to move said pressor transversely over the inking vehicle and across said tape to make a printing impression thereon.

13. In a time cost system, the combination of a plurality of meters having each a drum adapted to feed a tape mechanism for rotating the drum at a substantially uniform speed predetermined at a different rate in each case to correspond to the characteristic rate of time cost for the operation performed, means for varying the feed to correspond to a different time cost rate, means for indicating on the tape the beginning of a time period, and a common linear scale of value whereby the marked off lengths of tape when measured thereon will denote the cost of the corresponding operation, the tape-feeding drum having a circumference equal to the linear distance occupied by an integral number of value units on the said scale.

14. In a time cost recorder the combination with recording mechanism and means coöperating therewith including a removable identification member comprising a sheet metal plate with raised printing characters thereon for indicating the nature of the work, and a second removable identification member also containing raised printing characters for identifying the workman interfitting with said first member to permit their simultaneous application to the mechanism to make a unitary, localized record.

15. In a time cost recorder the combination with recording mechanism of means coöperating therewith including a removable identification member comprising a channel-shaped sheet metal plate with raised printing characters thereon for identifying the work, and a second removable identification member fitting said channel plate and adapted for simultaneous use therewith also having raised printing characters for identifying the workman.

16. In a recording machine, means whereby a record surface may be moved proportionally both to elapsed time and time cost rate, means for changing the rate of movement to correspond with changes in time cost rate, recording mechanism, and means coöperating with said recording mechanism including a plurality of removable identifying members each having printing characters thereon and adapted to be simultaneously applied to the machine to coöperate with the recording mechanism therein.

17. In a time cost system, the combination with a plurality of measuring devices having each means for holding a record surface, a marker to mark the beginning of a time period on each, means for changing each surface whereby the latter may be moved relatively to the marker proportionately both to elapsed time and time cost whereby the length of each subdivision marked on the surface represent on a linear multiple rate scale a certain time cost value irrespective either of the elapsed time or the time cost associated therewith, a job indicating member removable from the machine and adapted to accompany the material on which the work is performed, said member comprising a sheet metal strip having longitudinal flanges and having printing characters embossed on its face, and mechanism embodied in the machine adapted to coöperate with said printing characters for imprinting the same upon the record surface representing the time period.

18. In a time cost system, the combination with a plurality of measuring devices having each means for holding a record surface, a marker to mark the beginning of a time period on each, means for changing each surface whereby the latter may be moved relatively to the marker proportionately both to elapsed time and time cost, whereby the length of each subdivision marked on the surface represents on a linear, multiple rate scale a certain time cost value irrespective either of the elapsed time or the time cost associated therewith, a job indicating member removable from the machine and adapted to accompany the material on which the work is performed, said member having printing characters thereon, a second indicating member removable from the machine and also bearing printing characters, and mechanism embodied in the machine adapted to coöperate simultaneously with both said indicating members for imprinting the said characters on the record surface.

19. In a time cost system, the combination with a plurality of measuring devices having each means for holding a record surface, a marker to mark the beginning of a time period on each, means for feeding each surface whereby the latter may be moved relative to its marker proportionately both to elapsed time and time cost, a plurality of removable identifying members each bearing printing characters and mechanism embodied in the machine adapted simultaneously to coöperate with said identifying members for placing said characters on the record surface representing a given time period.

20. In a time cost system, the combination of a plurality of measuring devices having each means for holding a record surface, a marker to mark the beginning of a time period on each, means for feeding each surface whereby the latter may be moved relatively to its marker proportionately both to elapsed time and time cost whereby the length of each subdivision marked on the surface represents on a linear, multiple rate scale a certain time cost value irrespective either of elapsed time or the time cost rate associated therewith, a job indicating member removable from the machine and adapted to accompany the material on which the work is performed, a second indicating member bearing printing characters identifying the workman, and mechanism embodied in the machine and adapted to coöperate with said indicating members for simultaneously applying said marker to the record surface representing the time period and for applying a symbol representing the job to which it pertains and for applying a symbol identifying the workman whereby subdivisions taken from different devices or different portions of the same surface but relating to the same job may be identified and aggregated, in their aggregate length applied to the said scale to determine the time cost of that job, and whereby the workman for each time period may be separately identified.

21. A time cost meter having a plurality of record sheets, means for feeding said sheets in superimposed relation but at independently controlled rates of speed, and marking means for simultaneously marking on each sheet the beginning of the time period and also an identification mark, said means including a printing plate across which said sheets are adapted to be fed, said printing plate being separable and removable from the machine in two parts, one constituting a work identification part and the other an operative identification part.

22. A time cost meter having a record sheet, means for feeding said sheet, means for simultaneously marking on said sheet the beginning of a time period and also having an identification mark, said means comprising a printing plate across which the sheet is adapted to be fed, ink transfer means in contact with the sheet, and means for pressing the sheet against the printing plate, said printing plate being separable and removable from the machine in two parts, one constituting a work identification part and the other an operative identification part.

23. In a recording machine means whereby a record surface may be moved proportionately both to elapsed time and time cost rate, recording mechanism, and means cooperating with said recording mechanism including a plurality of removable, interfitting identifying members each having printing characters thereon and adapted to be simultaneously applied to said machine as a unitary printing device to cooperate with the recording mechanism therein.

24. In a recording machine, means for feeding the recording surface, a printing mechanism disposed to act on said record surface, and a plurality of removable, interfitting, identifying members each having printing characters thereon and adapted to be simultaneously applied to the machine as a unitary printing device to cooperate with the printing mechanism.

25. An identification device adapted for use with a recording machine comprising a bar having one end formed for engagement with an abutment within the machine, a printing character adjacent said end, the bar having an abutment surface, a plate adapted to be held by said abutment surface, and a printing character on said plate lying adjacent the first mentioned character and registering perforations through the bar and plate.

26. In a recording machine, the combination with a rotary tape feeding member with mechanism to rotate the same at a speed predetermined with reference to the characteristic rate of time cost for the operation performed, means for indicating on the tape the beginning of a time period, and a common linear scale of value whereby the lengths of the tape when measured thereon will denote the cost of the corresponding operation, the tape feeding member having a circumference equal to the linear distance occupied by an integral number of value units on the said scale.

In testimony whereof, I have signed my name to this specification, in the presence of two subscribing witnesses.

JOHN T. QUIGLEY.

Witnesses:
JOHN R. MOULTON,
THOMAS B. BOOTH.